(12) United States Patent
Devitt et al.

(10) Patent No.: US 9,106,739 B1
(45) Date of Patent: Aug. 11, 2015

(54) PROVIDING CALLER IDENTIFICATION TO MOBILE DEVICES

(71) Applicant: WhitePages, Inc., Seattle, WA (US)

(72) Inventors: Jason Anthony Devitt, San Francisco, CA (US); Michael Lloyd Wells, Redwood City, CA (US)

(73) Assignee: WhitePages, Inc., Seattle, WA (US)

( * ) Notice: Subject to any disclaimer, the term of this patent is extended or adjusted under 35 U.S.C. 154(b) by 0 days.

(21) Appl. No.: 14/255,941

(22) Filed: Apr. 17, 2014

Related U.S. Application Data

(63) Continuation of application No. 14/095,869, filed on Dec. 3, 2013, which is a continuation of application No. 13/214,098, filed on Aug. 19, 2011, now Pat. No. 8,626,137.

(60) Provisional application No. 61/375,416, filed on Aug. 20, 2010.

(51) Int. Cl.
*H04M 3/42* (2006.01)
*H04W 4/16* (2009.01)

(52) U.S. Cl.
CPC ............ *H04M 3/42059* (2013.01); *H04W 4/16* (2013.01)

(58) Field of Classification Search
CPC ........................ H04M 3/42042; H04M 3/4931
USPC ............ 455/410–417, 567; 379/88.21–88.23, 379/142.01–142.18
See application file for complete search history.

(56) References Cited

U.S. PATENT DOCUMENTS

| 6,253,075 | B1 | 6/2001 | Beghtol et al. |
| 2007/0064920 | A1* | 3/2007 | Ruckart .................. 379/355.07 |
| 2007/0201650 | A1* | 8/2007 | Mastro ..................... 379/142.01 |
| 2009/0157732 | A1 | 6/2009 | Hao et al. |
| 2009/0298489 | A1 | 12/2009 | Chitturi et al. |
| 2010/0056117 | A1 | 3/2010 | Wolfman et al. |
| 2010/0198854 | A1 | 8/2010 | Chitturi et al. |
| 2010/0203874 | A1 | 8/2010 | Scott et al. |
| 2011/0014900 | A1* | 1/2011 | Gottfried ...................... 455/415 |

OTHER PUBLICATIONS

"Avoid Spam Calls with Truecaller," Trueman, True Software Scandinavia AB, Jun. 2, 2010, 4 pages.
"Truecaller 2.0 for Android is Finally Released! Woohoo!," Trueman, True Software Scandinavia AB, Oct. 19, 2010, 4 pages.
United States Office Action, U.S. Appl. No. 13/214,098, Mar. 18, 2013, 10 pages.

* cited by examiner

*Primary Examiner* — Kashif Siddiqui
(74) *Attorney, Agent, or Firm* — Fenwick & West LLP

(57) ABSTRACT

A caller information server provides caller identification (ID) information to a mobile device. The server receives caller ID information from local address books stored on multiple mobile devices. The caller information server aggregates the received caller ID information to generate a pooled address book. The caller information server may determine whether names within the caller ID information are legitimate and store or filter the information accordingly. When a mobile device receives a call from a telephone number for which it lacks caller ID information in its local address book, the mobile device sends a request for the caller ID information for the telephone number, to the caller information server. The server identifies caller ID information associated with the telephone number in the pooled address book, and sends this information to the mobile device.

17 Claims, 8 Drawing Sheets

PROVIDING CALLER IDENTIFICATION TO MOBILE DEVICES

CROSS-REFERENCE TO RELATED APPLICATION

This application is a continuation of U.S. patent application Ser. No. 14/095,869, filed Dec. 3, 2013, which is a continuation of U.S. patent application Ser. No. 13/214,098, filed Aug. 19, 2011, which claims benefit of U.S. Provisional Application No. 61/375,416, filed Aug. 20, 2010. Each of these applications is incorporated herein in its entirety.

BACKGROUND

1. Field of Disclosure

This invention relates generally to mobile communications, and more specifically to techniques for determining caller ID information associated with telephone calls.

2. Description of the Related Art

Users of a mobile device can send and receive telephone calls and text messages to and from a wide range of telephone numbers. Mobile devices include, for example, cellular telephones. Many mobile devices are capable of saving and accessing information related to telephone calls and text messages. A mobile device may include an address book that lists contacts stored by a user of the device along with telephone numbers and other information about the contacts. The mobile device may also store a history of telephone numbers corresponding to outbound and inbound calls, and may store a history of sent and received text messages. The user can use this information in order to answer particular telephone calls that may be urgent to the user or to screen particular telephone calls. However, if a telephone number is not stored on the user's mobile device, the user cannot determine whether the telephone call is from a contact that the user wants to communicate with or from a third party that a user wants to screen.

Phone operators may provide caller ID information for an incoming or outgoing telephone call by matching a telephone number against a particular database. For example, a mobile or a landline telephone operator may maintain a database of user telephone numbers associated with a user-provided billing name. Thus, a telephone operator may provide the billing name associated with a particular telephone number. However, most databases associated with a mobile telephone operator are incomplete because telephone operators only have access to billing information associated with their own customers. In general, telephone operators do not share their customer billing information with their competitors. Additionally, the user-provided billing name may be an inaccurate description of a telephone number in a case where one billing name is provided for several associated telephone numbers such as employer-provided telephone plans or telephone numbers in a family or a group payment plan. Finally, users of prepaid phones generally do not provide a billing name to mobile phone operators, thus a vast number of billing names associated with mobile device phone numbers are not available to mobile telephone operators. In practice, major mobile telephone operators in the US generally do not provide caller ID services to its customers at this time.

SUMMARY

The above and other needs are addressed by a method, computer and computer-readable storage media storing instruction for providing caller identification (ID) information to a mobile device. Embodiments of the method comprise receiving caller ID information from local address books of a plurality of mobile devices and generating a pooled address book that aggregates the received caller ID information. Additionally, the method comprises receiving a request from a mobile device for caller ID information associated with a telephone number wherein caller ID information associated with the telephone number is not present in a local address book of the mobile device. The method further comprises identifying caller ID information associated with the telephone number in the pooled address book and sending the identified caller ID information associated with the telephone number to the mobile device. The method may further comprise receiving caller ID information requests from plurality of mobile devices, wherein the caller ID information is associated with telephone numbers from which calls were made to the mobile device. The method comprises analyzing the requests from the plurality of mobile devices to detect nuisance calls that users are likely to decline to answer. Furthermore, responsive to the analysis indicating that a telephone number from which a call was made to a mobile device is associated with a nuisance call, the method comprises identifying the telephone number as being associated with a nuisance call in the identified caller ID information sent to the mobile device.

Embodiments of the computer-readable storage medium store executable computer program instructions. The instructions, in turn comprise receiving caller ID information from local address books of a plurality of mobile devices and generating a pooled address book that aggregates the received caller ID information. The instructions further comprise receiving a request from a mobile device for caller ID information associated with a telephone number wherein caller ID information associated with the telephone number is not present in a local address book of the mobile device. The instructions additionally comprise identifying caller ID information associated with the telephone number in the pooled address book and sending the identified caller ID information associated with the telephone number to the mobile device. The instructions further comprise receiving caller ID information requests from plurality of mobile devices, wherein the caller ID information is associated with telephone numbers from which calls were made to the mobile device. The instructions comprise analyzing the requests from the plurality of mobile devices to detect nuisance calls that users are likely to decline to answer. Furthermore, responsive to the analysis indicating that a telephone number from which a call was made to a mobile device is associated with a nuisance call, the instructions comprise identifying the telephone number as being associated with a nuisance call in the identified caller ID information sent to the mobile device.

Embodiments of the computer comprise a non-transitory computer-readable storage medium storing executable computer program instructions. The instructions, in turn comprise receiving caller ID information from local address books of a plurality of mobile devices and generating a pooled address book that aggregates the received caller ID information. The instructions further comprise receiving a request from a mobile device for caller ID information associated with a telephone number wherein caller ID information associated with the telephone number is not present in a local address book of the mobile device. The instructions additionally comprise identifying caller ID information associated with the telephone number in the pooled address book and sending the identified caller ID information associated with the telephone number to the mobile device. The instructions further comprise receiving caller ID information requests from plurality of mobile devices, wherein the caller ID information is associated with telephone numbers from which calls were made to the mobile device. The instructions comprise analyzing the requests from the plurality of mobile devices to detect nuisance calls that users are likely to decline to answer. Furthermore, responsive to the analysis indicating that a telephone number from which a call was made to a mobile device is associated with a nuisance call, the instructions comprise identifying the telephone number as being associated with a nuisance call in the identified caller ID information sent to the mobile device.

Additionally, a computer-implemented method of obtaining caller identification (ID) information associated with a telephone number is provided. Embodiments of the method comprise sending caller ID information from a local address book of a mobile device to a caller information server that is adapted to generate a pooled address book that aggregates caller ID information received from local address books of a plurality of mobile devices. The method further comprises sending a request to the caller information server requesting caller ID information for a telephone number responsive to detecting an incoming communication received by the mobile device from the telephone number, wherein the caller information server is adapted to identify caller ID information for the telephone number in the pooled address book. Additionally, the method comprises receiving the caller ID information for the telephone number from the caller information server. The method further comprises determining whether to block the incoming communication responsive to the received caller ID information and blocking the incoming communication responsive to a positive determination.

DETAILED DESCRIPTION

The figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
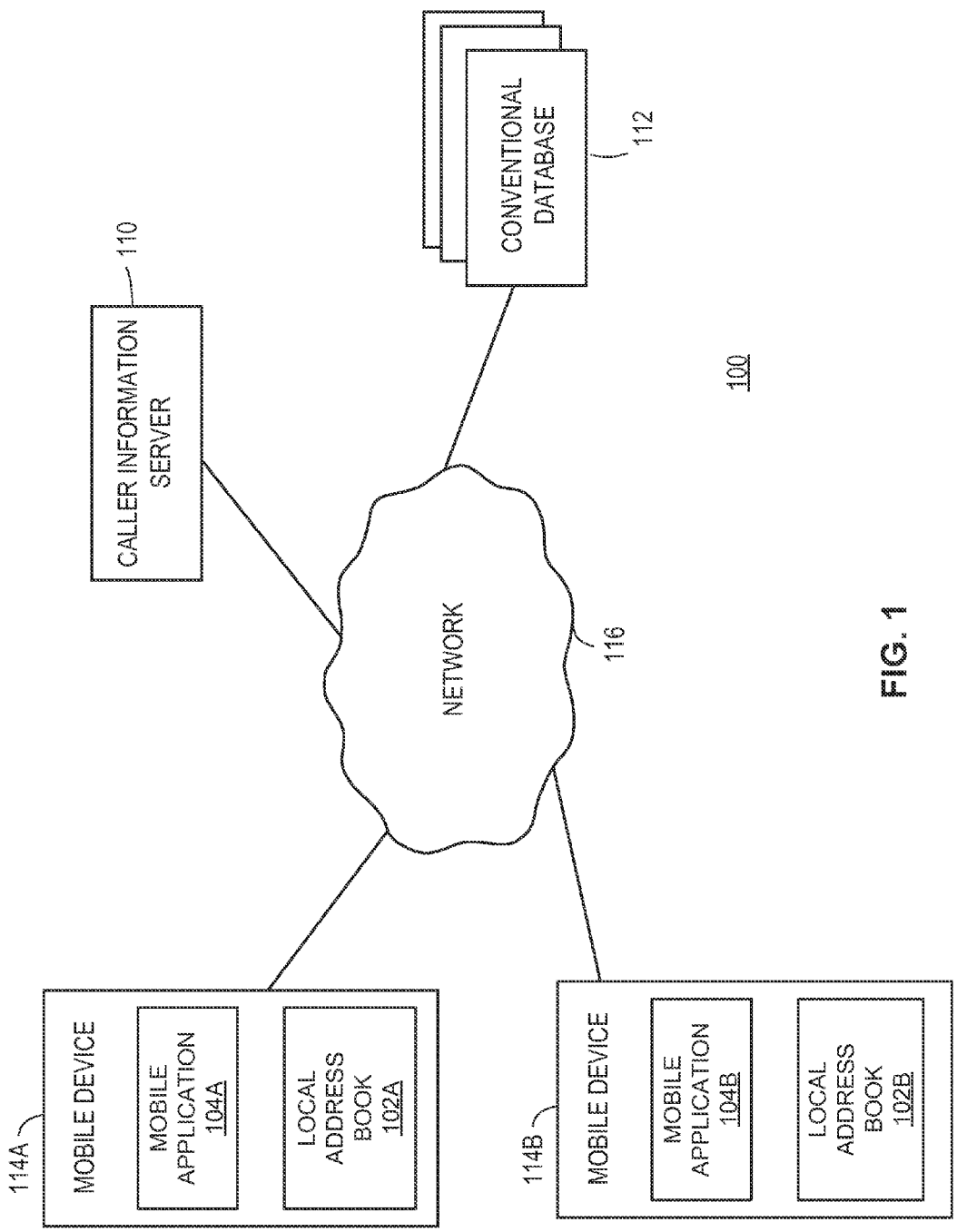
FIG. 1 is a high-level block diagram that illustrates a computing environment for determining caller ID information associated with a telephone number according to one embodiment.

FIG. 1 is a high-level block diagram that illustrates a computing environment 100 for determining caller ID information associated with a telephone number according to one embodiment. As shown, the computing environment 100 includes a caller information server 110, a conventional database 112 and multiple mobile devices 114A-B connected through a network 116. Only one caller information server 110, one conventional database 112 and two mobile devices 114 are illustrated in FIG. 1 in order to simplify and clarify the present description. Embodiments can have millions of mobile devices 114, multiple caller information servers 110 and multiple conventional databases 112. There can be other entities in the computing environment 100 as well.

The mobile devices 114 are electronic devices that are used by users to place and receive telephone calls. Examples of mobile devices 114 include mobile telephones, portable digital assistants (PDAs), notebook and tablet computers, and other devices with telephone functionality. Although this description refers to the devices as "mobile," the devices need not be portable. The phrase "mobile device" can also include a device that is typically stationary, such as a desktop computer.

In one embodiment, the mobile devices 114 include local address books 102 storing information associated with people or businesses with whom the users communicate. The information in a local address book 102 of a mobile device 114 can be manually entered by the user of the mobile device and/or synchronized from another source, such as a MICROSOFT EXCHANGE server. The local address book 102 information can include, for example, the name of a person and a picture of the person, along with contact details for that person such as one or more telephone numbers, work and/or business addresses, an email address, etc. The local address book 102 information can also include communication data, including call statistics describing calls placed or received by the mobile devices 114, such as the date, frequency and/or duration of calls to people listed in the local address book. For purposes of this description, the information about a person or other entity stored in a local address book 102 is called the "caller identification (ID) information." The phrase "caller ID information" can also refer to a subset of the information about a person stored in the address book, such as the person's name, telephone numbers, and picture.

In typical use, the mobile device 114 uses the caller ID information in the local address book 102 to display information about calling and called parties to the user. When the mobile device 114 receives an inbound call, the mobile device determines the telephone number from which the inbound call was placed and accesses the local address book 102 to obtain caller ID information associated with the telephone number. For example, the mobile device 114 can display the name and picture of the caller to the user. If, however, the local address book 102 lacks information about the calling telephone number, the mobile device 114 typically displays only the telephone number to the user.

This limitation of the mobile device 114 is overcome by a mobile application 104 that executes on a mobile device 114 and provides caller ID information for callers that are not listed within the device's local address book 102. The mobile application 104 can be incorporated into the operating system of the mobile device 114 and/or provided by a third party, such as the operator of the caller information server 110. For example, the user of the mobile device 114 can download the mobile application from an application store and install it on the mobile device.

In one embodiment, the mobile application 104 provides the caller ID information in the mobile device's local address book 102 to the caller information server 110 via the network 116. For example, the mobile application 104 can provide names, telephone numbers, and pictures from the local address book 102 to the caller information server 110. In addition, the mobile application 104 receives caller ID information for unknown callers from the caller information server 110. When the mobile device 114 receives a call from an unknown caller (i.e., from a telephone number not listed in the local address book 102), the mobile application 104 queries the caller information server 110 for caller ID information associated with the telephone number that called the mobile device 114. The mobile application 104 receives the caller ID information from the caller information server 110 and presents the information to the mobile device 114 for display to the user. The mobile application 104 can also use the caller ID information to perform auxiliary services, such as blocking nuisance calls.

The caller information server 110 is a hardware device and/or software program configured to provide the mobile devices 114 with caller ID information. The caller information server 110 interfaces with the mobile application 104 of the mobile devices 114 and receives the caller ID information from the local address books 102 of the devices. The caller information server 110 aggregates the received information to form a "pooled address book."

Upon receiving a request for caller ID information from a mobile device 114, the caller information server 110 determines whether the information is stored within the pooled address book or a conventional database 112. Because the pooled address book aggregates caller ID information from local address books 102 of many mobile devices, the requested information is likely to be included therein. If the caller ID information is in the pooled address book or a conventional database, the caller information server 110 provides the caller ID information to the requesting mobile device 114. The caller information server 110 can also perform other functions, such as detecting nuisance calls based on caller ID information requests from mobile devices, and purging stale information from the pooled address book.

The one or more conventional databases 112 provide caller ID information to the caller information server 110. In one embodiment, if caller ID information associated with a phone number is not present in the pooled address book, the caller information server 110 queries a conventional database 112 to retrieve the caller ID information. In one embodiment, a conventional database 112 is maintained by a telephone service provider, a commercial database provider, or by another entity. Thus, the conventional databases 112 are supplemental sources of information the caller information server 110 can use in addition to the pooled address book.

The network 116 enables communications between the caller information server 110, the mobile devices 114, and the conventional databases 112. In one embodiment, the network 116 uses standard communications technologies and/or protocols and can include the Internet as well as mobile telephone networks. Thus, the network 116 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 116 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 116 can be represented using technologies and/or formats including image data in binary form (e.g. Portable Network Graphics (PNG)), the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities on the network 116 can use custom and/or dedicated data communications technologies instead of, or in addition to, the ones described above.

Figure 2:
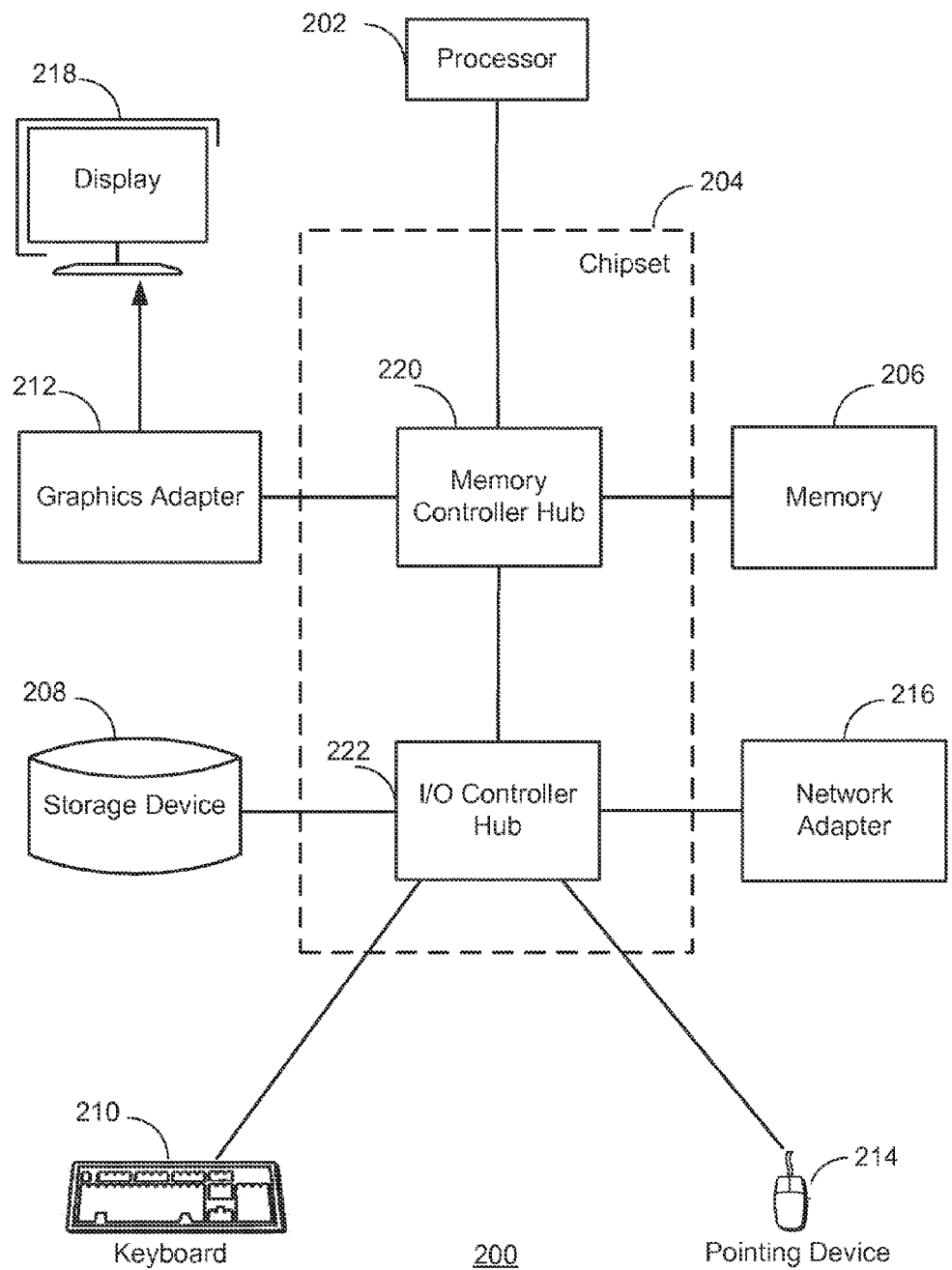
FIG. 2 is a high-level block diagram illustrating a typical computer for use as a caller information server or mobile device according to one embodiment.

FIG. 2 is a high-level block diagram illustrating a typical computer 200 for use as a caller information server 110 or mobile device 112. Illustrated are a processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer 200 to the network 116.

As is known in the art, a computer 200 can have different and/or other components than those shown in FIG. 2. In addition, the computer 200 can lack certain illustrated components. In one embodiment, a computer 200 acting as the caller information server 110 is formed of multiple blade computers and lacks a keyboard 210, pointing device 214, graphics adapter 212, and/or display 218. Moreover, the storage device 208 can be local and/or remote from the computer 200 (such as embodied within a storage area network (SAN)). As another example, a mobile device 114 might comprise a Smartphone with limited processing power and a touch screen interface.

This description uses the term "module" to refer to computer program logic for providing a specified functionality. A module can be implemented in hardware, firmware, and/or software. A module is typically stored on a computer-readable storage medium such as the storage device 208, loaded into the memory 206, and executed by the processor 202.

Figure 3:
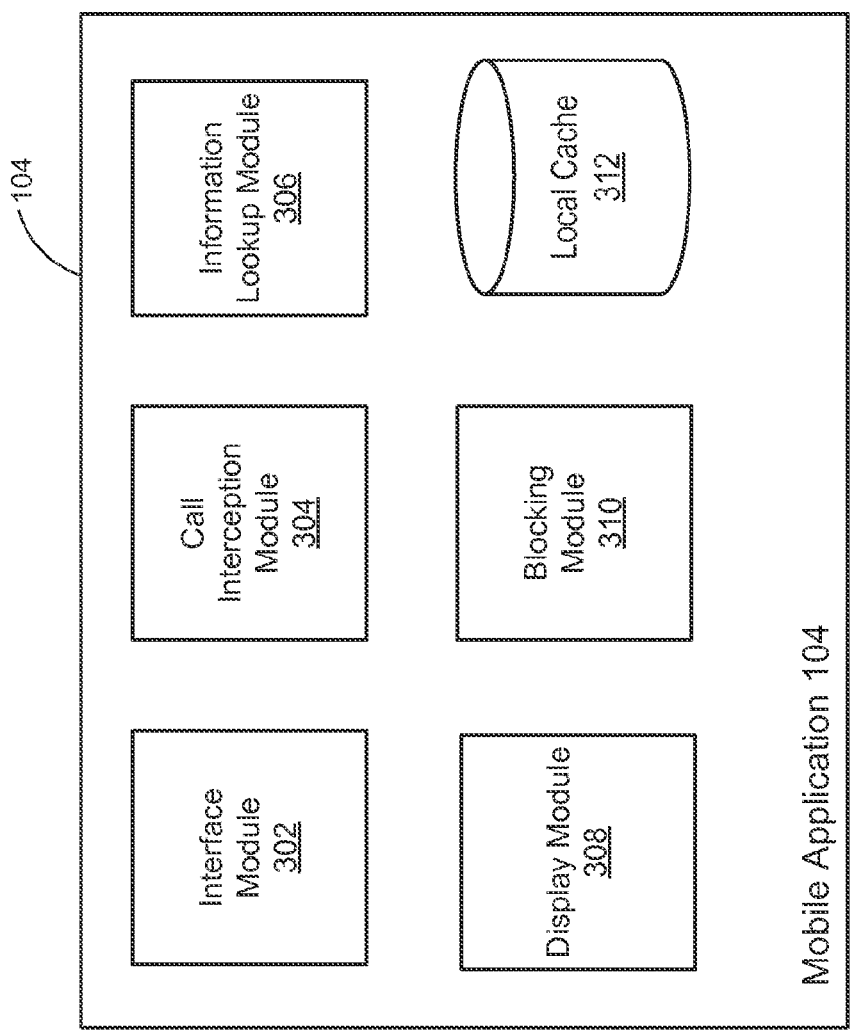
FIG. 3 is a high-level block diagram illustrating a detailed view of modules within a mobile application according to one embodiment.

FIG. 3 is a high-level block diagram illustrating a detailed view of modules within the mobile application 104 according to one embodiment. The mobile application includes an interface module 302, a call interception module 304, an information lookup module 306, a display module 308, a blocking module 310 and a local cache 312. Some embodiments of the mobile application 104 have different and/or other modules than the ones described herein. Similarly, the functions can be distributed among the modules in accordance with other embodiments in a different manner than is described here. Likewise, the functions can be performed by other entities.

The interface module 302 interfaces the mobile device 114 with the caller information server 110 to exchange information. In one embodiment, the interface module 302 sends caller ID information from the mobile device's local address book 102 to the caller information server 110. To this end, the interface module 302 accesses the local address book 102, identifies caller ID information contained therein, and sends the caller ID information to the caller information server 110. As mentioned above, in one embodiment the interface module 302 sends only a subset of information in the local address book to the caller information server 110. For example, in one embodiment the interface module sends the names and telephone numbers of people described in the local address book 102 to the server 110, but does not send addresses, job titles, and other information that may be present in the address book. In addition, an embodiment of the interface module 302 also sends communications data including call statistics, such as dates on when the mobile device 114 last placed or received a call with a person identified in the local address book, to the caller information server 110. The interface module 302 can send the caller ID information to the caller information server 110 on a periodic basis, at the request of the user, upon update of the local address book 102, and/or at other times. In one embodiment, a user of a mobile device 114 can send caller ID information associated with his or her own mobile device 114. To this end, a user can announce a user name, business, purpose of call or other contact information to others.

The call interception module 304 intercepts processing of telephone calls incoming to the mobile device 114. In one embodiment, the call interception module 304 detects when an incoming telephone call is received by the mobile device 114, and supplements or replaces functionality on the mobile device 114 for displaying caller ID information to the user. While this description refers to processing of telephone calls, "telephone calls," as used herein, also refers to other communications made using the mobile device 114, such as text and multimedia messages.

Upon intercepting the telephone call, the call interception module 304 determines the telephone number of the calling party, and determines whether this telephone number is in the local address book 102. In one embodiment, if the number is in the local address book 102, the call interception module 304 returns processing to the mobile device 114 and lets the mobile device resume normal processing of the call. If, however, the telephone number is not in the local address book, an embodiment of the call interception module 304 activates the information lookup module 306 to obtain caller ID information from a local cache 312 of caller ID information obtained from the caller information server 110 or by communicating with the caller information server 110. The call interception module 304 can also activate the information lookup module 306 in other situations where the caller information server 110 might have more accurate caller ID information than the local address book 102, such as when a predetermined amount of time has elapsed since the last communication from the caller and/or when the information in the local address book 102 is incomplete.

The information lookup module 306, in turn, performs a lookup operation in the local cache 312 or with the caller information server 110 to determine caller ID information associated with a telephone number. The local cache 312 may contain results from recent lookups, or it may contain a predetermined and regularly updated list of numbers that are likely callers, such as a list of nuisance callers. In one embodiment, the information lookup module 306 receives the telephone number of the calling party from the call interception module 304 and sends the number to the caller information server 110 within a request for caller ID information. Assuming the telephone number has associated caller ID information within the pooled address book or conventional databases 112, the information lookup module 306 receives caller ID information from the caller information server 110 in response to the lookup. The caller ID information can also indicate whether the call is likely from a nuisance caller, such as a telemarketer.

Some embodiments of the mobile application 114 include a blocking module 310 that automatically blocks certain types of incoming telephone calls before they are displayed to the user by the display module 308. In one embodiment, a user can provide a blacklist of phone numbers or user names to the blocking module 310. The user names may include an individual's name or an entity's name. The blocking module 310 blocks incoming communications from the blacklisted phone number. Additionally, the blocking module 310 may receive a name associated with an incoming phone call or communication from the interface module 302 or the information lookup module 306. If the user name matches a name on the blacklist, the block module 310 may block the incoming communication. In one embodiment, the user can configure the blocking module 310 to automatically block calls flagged as nuisance calls by the caller ID information returned from the caller information server 110. Other embodiments can block different and/or additional types of calls.

The display module 308 displays the caller ID information retrieved by the information lookup module 306 to the user of the mobile device 114. In one embodiment, the display module 308 receives the caller ID information from the information lookup module 306. As mentioned above, the caller ID information can include, e.g., a name and picture associated with the telephone number. The display module 308 interacts with the mobile device 114 to cause the caller ID information to be displayed on a display of the mobile device. The display module 308 can also display information related to previous communications with the caller, such as a date and length of a prior call. In one embodiment, the call interception and information lookup performed by the call interception 304 and information lookup 306 modules are performed quickly, such that the received caller ID information is presented to the user by the display module 308 contemporaneously with when the user evaluates whether to answer the call on the mobile device 114.

In some embodiments, the display module 308 also displays other information associated with the incoming call. The display module 308 can provide an indication of whether the call is likely a nuisance call (e.g., from a telemarketer or similar type of calling party). In addition, the display module 308 can display a user interface permitting the user to save the retrieved caller ID information in the local address book 102 or to report the caller as a nuisance caller.

Figure 7:
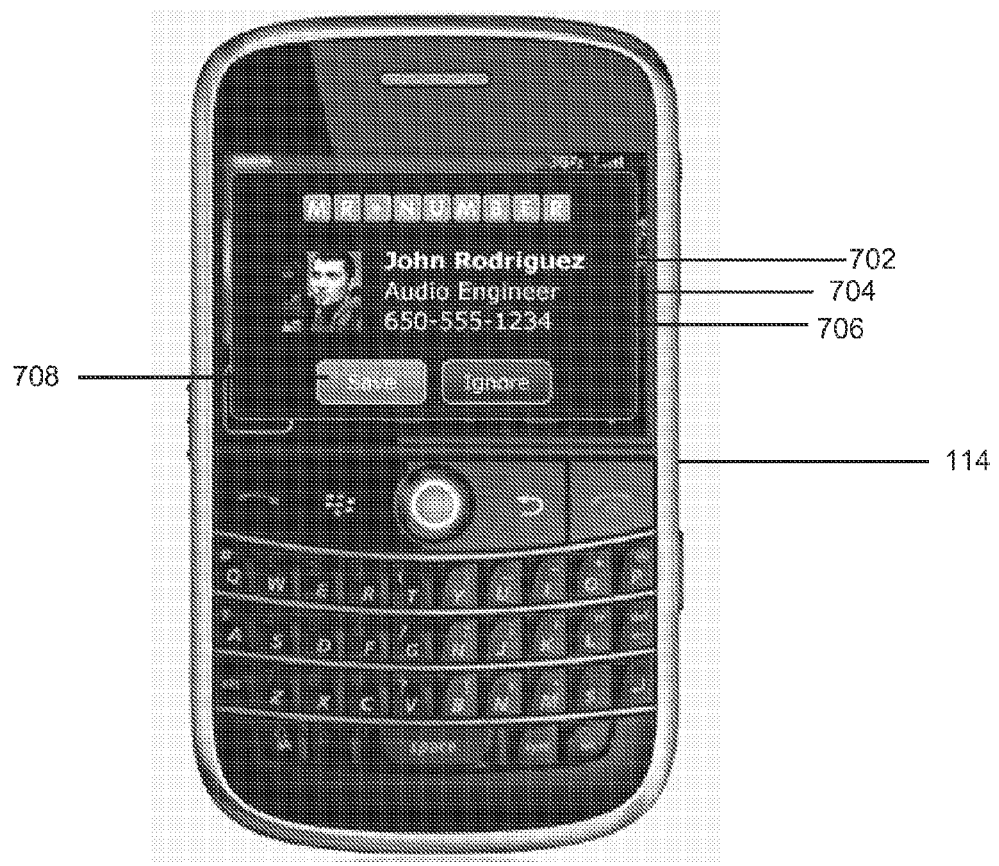
FIG. 7 illustrates an exemplary user interface presented by a display module in one embodiment.
Figure 8:
FIG. 8 illustrates an exemplary user interface presented by a display module in one embodiment.

FIGS. 7 and 8 illustrate exemplary user interfaces presented by the display module 308 in some embodiments. The user interface includes caller ID information such as a name 702 of the person associated with the telephone number, employment information 704 of the person associated with the telephone number and the telephone number 706. Additionally, the user interface illustrated in FIG. 7 allows a user to save 708 the caller ID information of a previously unknown number to the local address book 102 of a mobile device 114, or to ignore the prompt to save the unknown number to the local address book 102.

Figure 4:
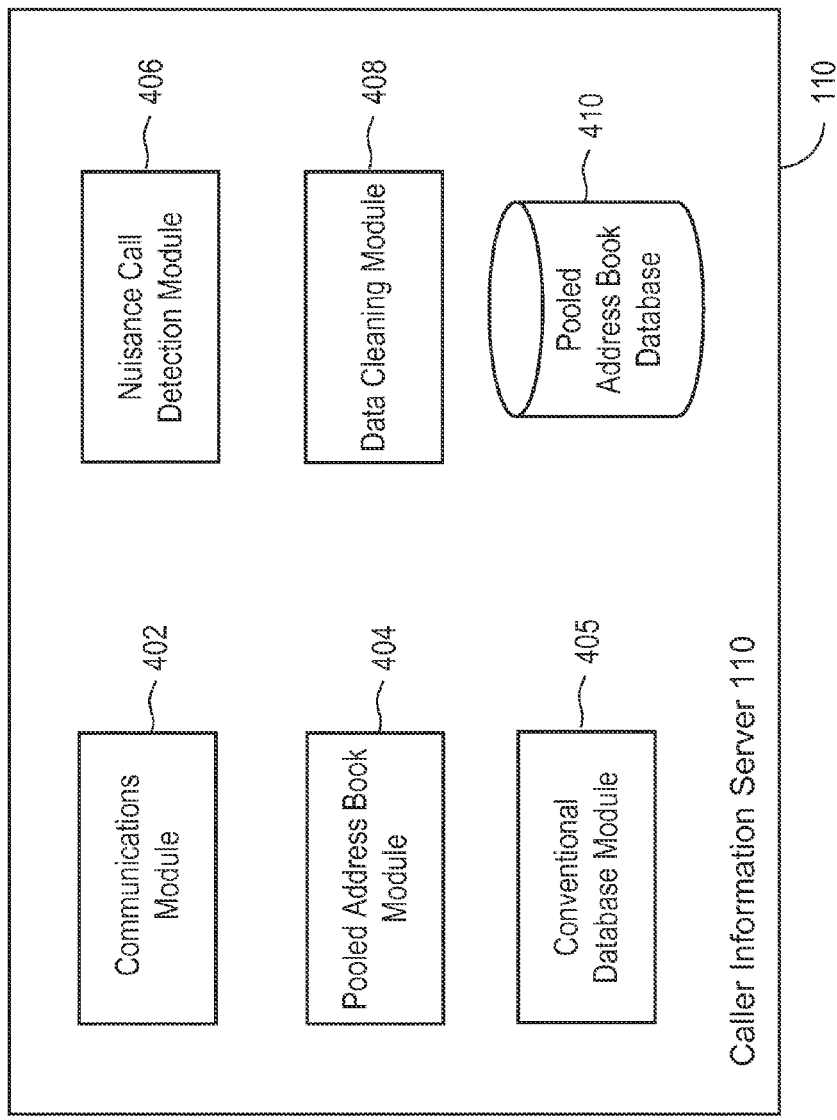
FIG. 4 is a high-level block diagram illustrating a detailed view of modules within a caller information server according to one embodiment.

FIG. 4 is a high-level block diagram illustrating a detailed view of modules within the caller information server 110 according to one embodiment. The modules include a communications module 402, a pooled address book module 404, a conventional database module 405, a nuisance call detection module 406, a data-cleaning module 408, and a pooled address book database 410. Some embodiments of the caller information server 110 have different and/or other modules than the ones described herein. Similarly, the functions can be distributed among the modules in accordance with other embodiments in a different manner than is described here. Likewise, the functions can be performed by other entities.

The communications module 402 interfaces with the mobile devices 114. In one embodiment, the communications module 402 receives the caller ID information from the local address books 102 of the mobile devices 114. The caller ID information may be received on a periodic basis, at a request of a mobile device's user, upon update of a local address book of the mobile device, and/or at other times. The communication module 402 sends the received caller ID information to the pooled address book module 404, wherein the pooled address book module 404 updates the pooled address book database 410. As such, the pooled address book database 410 may be continually updated as caller ID information is received from a mobile device. In addition, the communications module 402 receives caller ID information lookup requests from the mobile devices 114. The communications module 402 may also receive information from a mobile device each time the mobile device initiates or receives a communication with a phone number. The received information may include a phone number, whether a communication was initiated by the phone number a time and date of the communication. As mentioned previously, the communication may include a phone call, a text message, a multi-media message, etc. As a result of receiving information each time a communication is initiated or received by the mobile device, the caller information server 110 can save a contact record between a mobile device and a phone number. Therefore, a mobile device user may be able to access contact records from the caller information server 110. The communications module 402 also sends information to the mobile devices 114, including caller ID information sent in response to lookup requests. In one embodiment, the communications module 402 also interfaces with one or more conventional databases 112. In such an embodiment, the communications module 402 receives caller ID information from the conventional databases 112.

The pooled address book module 404 maintains the pooled address book database 410. The pooled address book module 404 receives the caller ID information from the local address books 102 of the mobile devices 114, any conventional databases 112, and other sources of caller ID information and aggregates the information into a pooled address book. The pooled address book module 404 also processes the caller ID information to detect irregularities, canonicalize the data, and/or for other purposes.

In one embodiment, the pooled address book module 404 checks names in the caller ID information for validity. For example, the name that a user supplies for a person in a local address book 102 may be a nickname or other name that is not suitable for use by users of other mobile devices 114. The pooled address book module 404 detects such issues by checking names in the caller ID information against a white list of legitimate names, such as the U.S. Census name database. If a name does not appear in the white list, an embodiment of the pooled address book module 404 removes the name from the information or otherwise marks it as not suitable for sharing with mobile devices 114. The pooled address book module 404 can also use a list of subjective identifiers to filter such identifiers from the caller ID information. For example, the filter can identify and remove subjective identifiers such as 'husband,' 'wife,' 'dad' and 'mom' from the caller ID information.

In addition, an embodiment of the pooled address book module 404 detects conflicting caller ID information received from the mobile devices 114 and analyzes the caller ID information to select resolved information that resolve the conflicts. For example, if the caller ID information identifies two different names associated with the same telephone number, the pooled address book module can use a voting system to select the resolved name. The voting system uses the name indicated by the majority of the caller ID information received from the various mobile devices 114. In another embodiment, if there is a name inconsistency, the pooled address book module 404 defaults to the name listed in the conventional database 112. In another embodiment, the pooled address book module 404 weighs information such as the duration, frequency, recency, and reciprocity of communication between different users and a single telephone number to determine which user is most likely to have accurate caller ID information for that number, and uses the name from that user's mobile device 114 as the resolved name. The pooled address book module 404 thus filters and refines caller ID information associated with one or more telephone numbers to generate an accurate pooled address book.

The pooled address book database 410 stores the pooled address book. In one embodiment, the pooled address book database 410 is a relational database using telephone numbers as the primary key. Given a telephone number, the other caller ID information associated with the telephone number can be rapidly obtained from the database. Other embodiments of the pooled address book database 410 are configured differently and/or use different types of databases.

The conventional database module 405 queries one or more of the conventional databases 112 when a suitable result corresponding to a phone number is not found in the pooled address book database 410. In one embodiment, the conventional database module 405 connects to a remote service via the network 116 to query for a result. In other embodiments, the conventional database module 405 is configured differently and may return caller ID information in different ways from the conventional database 112.

The nuisance call detection module 406 identifies nuisance calls based on the lookup requests and caller ID information. In general, nuisance calls are calls that users of the mobile devices 114 are likely to decline to answer. Nuisance calls are typically placed by telemarketers, pollsters, political advertisers and other such callers who use automated technology to call a large number of mobile devices 114. Since the telephone numbers from which these calls are placed are unlikely to be in the local address books 102 of the mobile devices 114, nuisance calls will typically cause the mobile applications 104 in the mobile devices to generate lookup requests to the caller information server 110.

An embodiment of the nuisance call detection module 406 analyzes the lookup requests and applies one or more heuristics to assign nuisance indication scores to detect nuisance calls based on the lookup requests. For example, if the same telephone number is used to call multiple users who are widely-dispersed geographically, the nuisance call detection module 406 may flag the telephone number as being associated with nuisance calls. Such a phone number may receive a high nuisance indication score. Similarly, if the same telephone number is used to call a large number of users within a short period of time, the nuisance call detection module 406 may flag the telephone number as being associated with nuisance calls or assign a high nuisance score to the phone number. Additionally, the heuristics can use other communication data, including call data such as the time of call, day of the week, duration of the calls, time interval in between two calls, whether the telephone number is stored as a contact in one or more local address books, the number of address books storing the telephone number, and the patterns of numbers called to detect nuisance calls. In one embodiment, if a phone number is not associated with a user in the pooled address book database 410 and conventional databases, the phone number may be flagged as a nuisance call or a nuisance phone number if it initiates communication with several mobile devices within a short period of time. As such, the nuisance call detection module 406 may detect a nuisance call in substantially real time as the nuisance caller initiates calling mobile devices. The nuisance call detection module 406 may also flag a phone number as a nuisance phone number if a user of a mobile device indicates that the phone number is associated with a nuisance caller.

As mentioned above, nuisance calls are flagged (i.e., identified as nuisance calls) when responding to caller ID information lookup requests from mobile devices 114, thereby giving the users the opportunity to decline to answer such calls. Further, in some embodiments users can flag nuisance calls they receive. The mobile devices 114 provide caller ID information about such flagged calls to the nuisance call detection module 406. The detection module 406 uses the provided information to identify subsequent nuisance calls from the same telephone number.

The data-cleaning module 408 determines whether the caller ID information within the pooled address book is current. The information in local address books 102 can grow stale over time as people change telephone numbers, jobs, etc. Therefore, there is a risk that caller ID information submitted to the caller information server 110 is stale (i.e., inaccurate) at the time of submission or has become stale since it was submitted. The data-cleaning module 408 analyzes the caller ID information in the pooled address book to detect and remove stale information. The analyzed information includes the communications data and call statistics received from the mobile devices 114.

In one embodiment, the data-cleaning module 408 analyzes the communications history involving telephone numbers to identify stale information. Communications history such as duration, frequency, recency and reciprocity of communication between a user and a telephone number affect whether caller ID information associated with a telephone number is determined to be stale. For example, if a user recently communicated with a particular telephone number, as indicated by the caller ID information, the data-cleaning module 408 would determine that the telephone number is not stale (i.e., is "fresh"). Similarly, if a user frequently communicates with a telephone number for a long duration of time, or the communications are initiated by both parties, the telephone number also is not stale. In one embodiment, the data-cleaning module 408 analyzes a variety of factors indicated by the communications history and assigns a particular telephone number entry a "freshness score" indicating the likelihood that the entry is stale. Entries having scores below a threshold are removed or otherwise designated as stale. In one embodiment, if one or more entries in a mobile device's local address book are deemed to be stale, the mobile application 104 executing on the mobile device may route all communication away from native communications applications such as phone and messaging application and may route communications through the mobile application 104.

Figure 5:
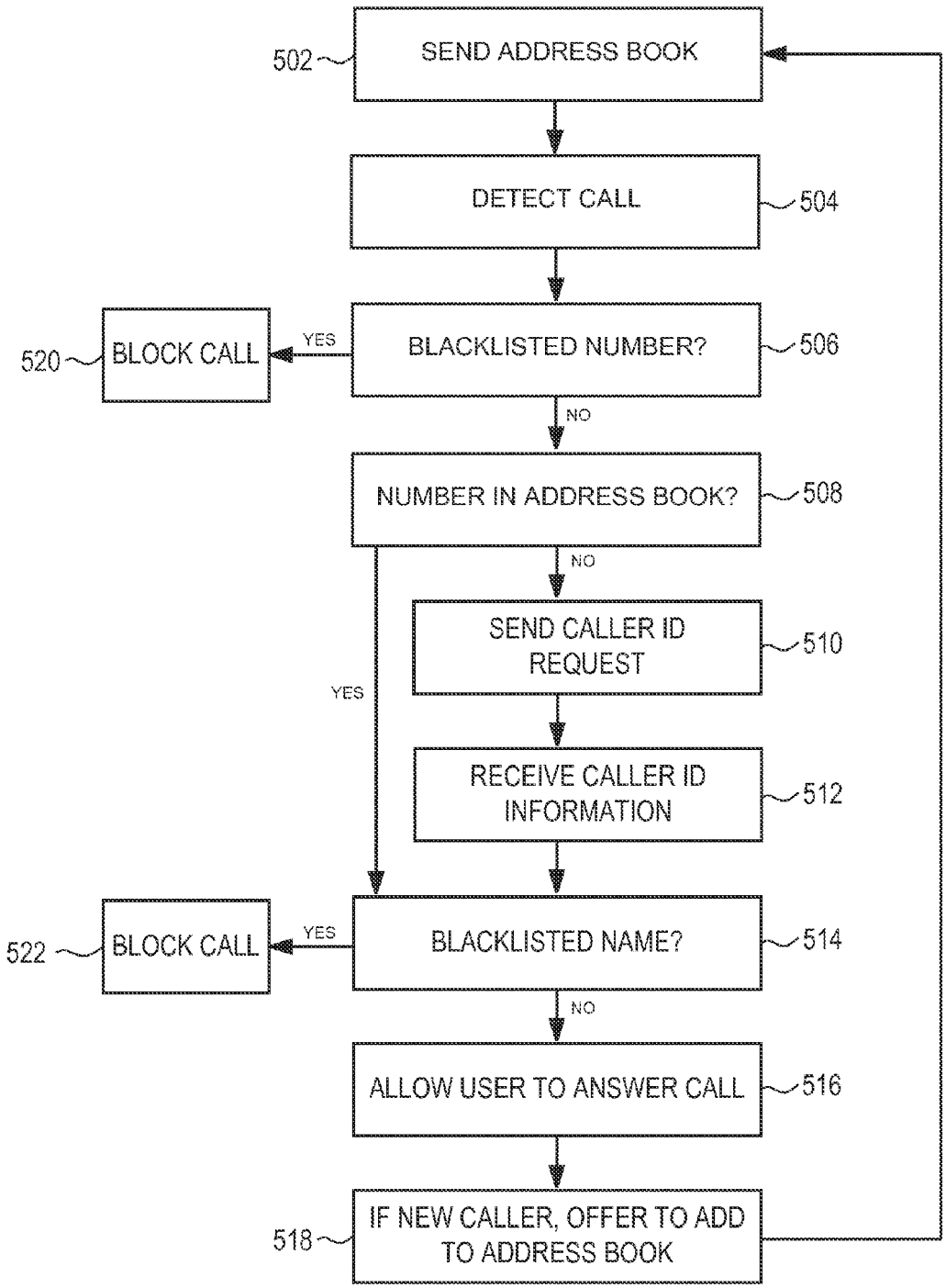
FIG. 5 is a flowchart illustrating a method of providing caller ID information associated with a telephone number according to one embodiment.

FIG. 5 is a flowchart illustrating a method of providing caller ID information associated with a telephone number according to one embodiment. In one embodiment, the method of FIG. 5 is performed by the mobile application 104, although some or all of the method can be performed by other modules in other embodiments. In addition, other embodiments can perform the steps of the method in different orders and can include different and/or additional steps.

The mobile application 104 initially sends 502 caller ID information from a local address book 102 of a mobile device 114 to the caller information server 110. In one embodiment, the mobile application 104 sends 502 updated caller ID information automatically every time the user executes the mobile application 104. In other embodiments, the caller ID information is sent 502 when the mobile application 104 is first executed, or on a periodic schedule. Further, in one embodiment the mobile application 104 sends the caller ID information when the mobile device 114 is in a low consumption state, such as being set on standby or on recharge mode.

In one embodiment, the mobile application 104 detects 504 a telephone call incoming to the mobile device 114 and ascertains the telephone number of the caller. Additionally, the mobile application 104 determines 506 whether the telephone number associated with the detected call is a blacklisted telephone number. For example, the mobile application 104 performs a lookup operation in a table of blacklisted numbers. In another embodiment, the mobile application 104 determines 506 whether a phone number is blacklisted based on rules configured via the application or via an automatically updated set of rules. For example, the automatic rules may be configured to identify and block all nuisance callers as determined by the nuisance call detection module 406. If the incoming telephone number is associated with a blacklisted number, the mobile application blocks 520 the incoming phone call. In one embodiment, the mobile application 104 automatically routes the phone call to a voice mailbox system. In another embodiment, the mobile application 104 hangs up on the incoming telephone such that the voice mail system is inaccessible by the caller. In another embodiment, the mobile application 104 routes nuisance calls to a voice system which states that the user will no longer accept calls from the caller and does not allow the caller to access the phone's voice mailbox system. In one embodiment, the mobile application 104 stores information associated with a blocked phone call in a blocked calls database. In such an embodiment, the user is not notified of an incoming phone call or that a phone call was blocked unless the user accesses the blocked call database. Similarly, a text message or a multi-media message from a nuisance caller may be routed to a spam folder wherein the user may quickly delete the received nuisance messages. In one embodiment, the mobile application 104 routes all communication away from the mobile devices native applications, including but not limited to, native voice calling application, messaging application and voice mailbox application. By routing all communication through the mobile application 104, a seamless experience can be provided to the mobile device's user wherein communication may not need to be transferred between the mobile application 104 and native applications executing on the mobile device.

In one embodiment, if the incoming telephone number is not a blacklisted phone number, the mobile application 104 determines 506 whether the telephone number associated with the detected call is stored in the local address book 102. If the telephone number associated with the incoming phone call is not found in the local address book, the mobile application 104 sends 510 a caller ID request to the caller information server 110. In one embodiment, the mobile application 104 receives 512 the requested caller ID information from the caller information server 110. In one embodiment, the received caller ID information includes a name of a caller associated with the detected phone number. In another embodiment, the mobile application receives 512 detailed information associated with the detected phone number, such as a business name, type of business, operating hours, name of a caller most associated with the business etc. Once the mobile application receives caller ID information associated with the incoming phone call, the process continues to step 514 as shown below.

In an embodiment, where the phone number associated with the detected phone number is stored 508 in a local address book of the user or once the caller ID information associated with the phone number is received 512, the mobile application 104 determines 514 if a name associated with the phone number is a blacklisted name. In one embodiment, the mobile application 104 performs a lookup operation in a database of blacklisted names to determine 514 if the name associated with the detected call should be blocked. In another embodiment, the mobile application determines 514 whether a name is blacklisted according to the rules configured via the application or as provided by the call detection module 406. If the name associated with the detected telephone number is a blacklisted name, the mobile application 104 blocks 522 the incoming phone call. In one embodiment, the mobile application 104 automatically routes the phone call to a voice mailbox system. In another embodiment, the mobile application 104 hangs up on the incoming telephone such that the voice mail system is inaccessible by the caller. In one embodiment, the mobile application stores information associated with a blocked phone call in a blocked calls database. In such an embodiment, the user is not notified of an incoming phone call or that a phone call was blocked unless the user accesses the blocked call database.

In an embodiment, where the mobile application 104 determines 514 that a name associated with the detected phone number is not a blacklisted name, the mobile application allows 516 a user to interact with the phone call by accepting or rejecting the incoming call.

In one embodiment, after the user either accepts or rejects the incoming phone call, the mobile application 104 offers the user an opportunity to add information about the caller to the local address book 102. For example, if the mobile application 104 does not receive 512 caller ID information responsive to a request 510, and the user knows additional information about the caller associated with the detected phone number, the user may add the additional information to a local address book 102 for future reference. In one embodiment, the mobile application 104 sends an updated address book to the caller information server 110 each instance the local address book is updated. In another embodiment, the mobile application 104 sends the address book to the caller information server 110 at periodic intervals or as disclosed above.

Figure 6:
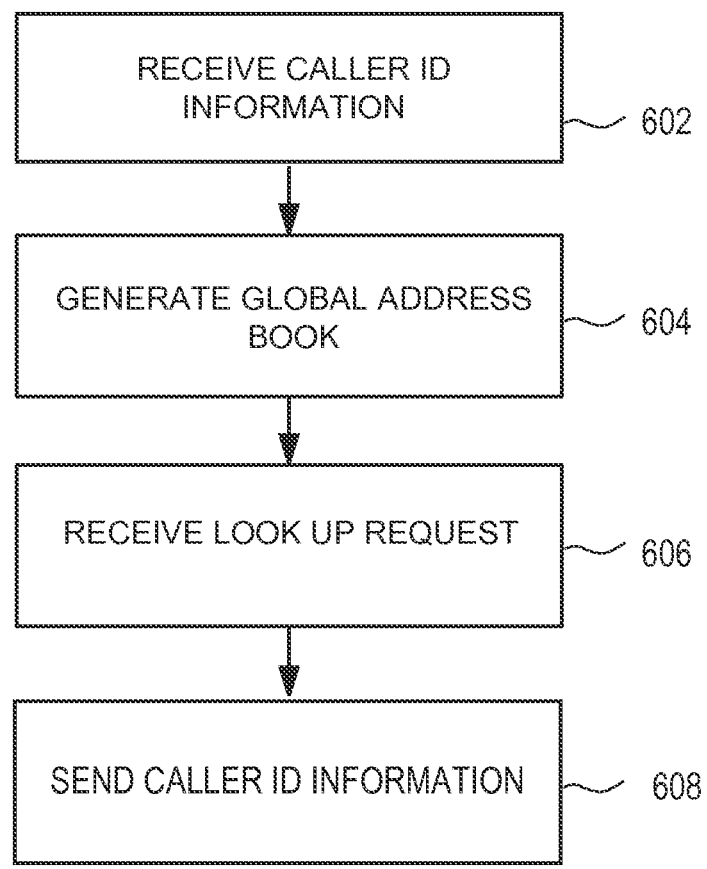
FIG. 6 is a flowchart illustrating a method of determining caller ID information associated with a telephone number according to one embodiment.

FIG. 6 is a flowchart illustrating a method of determining caller ID information associated with a telephone number according to one embodiment. In one embodiment, the method of FIG. 6 is performed by the caller information server 110, although some or all of the method can be performed by other entities in other embodiments. In addition, other embodiments can perform the steps of the method in different orders and can include different and/or additional steps.

The caller information server 110 receives 602 caller ID information. The information is received from local address books of multiple mobile devices 114 and/or from conventional database providers 112. The caller information server 110 generates 604 a pooled address book from the caller ID information. The caller information server 110 receives 606 a caller ID information lookup request from a mobile device 114. For example, the lookup request may be received responsive to the telephone number of an incoming call to a mobile device 110 not matching a number in that device's local address book 102. The caller information server 110 responds to the lookup request by searching for the telephone number identified by the lookup request in the pooled address book or in a conventional database. If a positive telephone number match is found, the caller information server 110 responds to the lookup request by sending 608 the caller ID information identified in the pooled address book as associated with the telephone number to the mobile device 114.

The above description is included to illustrate the operation of certain embodiments and is not meant to limit the scope of the invention. From the above discussion, many variations will be apparent to one skilled in the relevant art that would yet be encompassed by the spirit and scope of the invention.

What is claimed is:

1. A computer-implemented method of providing caller identification (ID) information to a mobile device, comprising:
    receiving caller ID information from local address books of a plurality of mobile devices used by a plurality of different users, the caller ID information including a plurality of names and associated telephone numbers;
    determining validity of names included in the caller ID information received from the plurality of mobile devices by:
        identifying a name associated with a telephone number in the received caller ID information;
        determining whether the name is within a white list of legitimate names; and
        determining that the name is valid responsive to the name being within the white list of legitimate names;
    identifying a subset of the caller ID information that includes one or more names determined to be valid and telephone numbers associated with the valid names; and
    generating a pooled address book that aggregates the subset of the caller ID information including the valid names and the telephone numbers associated with the valid names.

2. The method of claim 1, further comprising:
    receiving a request from a mobile device for caller ID information associated with a telephone number;
    identifying caller ID information in the pooled address book associated with the telephone number; and
    sending the identified caller ID information associated with the telephone number to the mobile device, the caller ID information comprising a valid name associated with the telephone number.

3. The method of claim 1, wherein the white list of legitimate names comprises names from a census name database.

4. The method of claim 1, wherein determining validity of names included in the caller ID information further comprises:
    determining whether the name is within a list of subjective identifiers; and
    removing the name from the caller ID information responsive to the name being within the list of subjective identifiers.

5. The method of claim 4, wherein the list of subjective identifiers comprises names known to denote relationships between two people.

6. The method of claim 1, wherein receiving caller ID information from local address books comprises receiving one or more of telephone numbers, names, addresses, job titles, and pictures from local address books stored on the plurality of mobile devices.

7. A computer system for pooling caller identification (ID) information received from a plurality of mobile devices, comprising:
- a processor; and
- a computer-readable storage medium comprising computer program code executable on the processor, the computer program code comprising instructions for:
  - receiving caller ID information from local address books of a plurality of mobile devices used by a plurality of different users, the caller ID information including a plurality of names and associated telephone numbers;
  - determining validity of names included in the caller ID information received from the plurality of mobile devices by:
    - identifying a name associated with a telephone number in the received caller ID information;
    - determining whether the name is within a white list of legitimate names; and
    - determining that the name is valid responsive to the name being within the white list of legitimate names;
  - identifying a subset of the caller ID information that includes one or more names determined to be valid and telephone numbers associated with the valid names; and
  - generating a pooled address book that aggregates the subset of the caller ID information including the valid names and the telephone numbers associated with the valid names.

8. The system of claim 7, wherein the computer program code further comprises instructions for:
- receiving a request from a mobile device for caller ID information associated with a telephone number;
- identifying caller ID information in the pooled address book associated with the telephone number; and
- sending the identified caller ID information associated with the telephone number to the mobile device, the caller ID information comprising a valid name associated with the telephone number.

9. The system of claim 7, wherein the white list of legitimate names comprises names from a census name database.

10. The system of claim 7, wherein determining validity of names included in the caller ID information further comprises:
- determining whether the name is within a list of subjective identifiers; and
- removing the name from the caller ID information responsive to the name being within the list of subjective identifiers.

11. The system of claim 10, wherein the list of subjective identifiers comprises names known to denote relationships between two people.

12. The system of claim 7, wherein receiving caller ID information from local address books comprises receiving one or more of telephone numbers, names, addresses, job titles, and pictures from local address books stored on the plurality of mobile devices.

13. A non-transitory computer-readable storage medium storing executable computer program instructions for pooling caller identification (ID) information received from a plurality of mobile devices, the computer program instructions comprising instructions for:
- receiving caller ID information from local address books of a plurality of mobile devices used by a plurality of different users, the caller ID information including a plurality of names and associated telephone numbers;
- determining validity of names included in the caller ID information received from the plurality of mobile devices by:
  - identifying a name associated with a telephone number in the received caller ID information;
  - determining whether the name is within a white list of legitimate names; and
  - determining that the name is valid responsive to the name being within the white list of legitimate names;
- identifying a subset of the caller ID information that includes one or more names determined to be valid and telephone numbers associated with the valid names; and
- generating a pooled address book that aggregates the subset of the caller ID information including the valid names and the telephone numbers associated with the valid names.

14. The storage medium of claim 13, the computer program instructions further comprising instructions for:
- receiving a request from a mobile device for caller ID information associated with a telephone number;
- identifying caller ID information in the pooled address book associated with the telephone number; and
- sending the identified caller ID information associated with the telephone number to the mobile device, the caller ID information comprising a valid name associated with the telephone number.

15. The storage medium of claim 13, wherein the white list of legitimate names comprises names from a census name database.

16. The storage medium of claim 13, wherein determining validity of names included in the caller ID information further comprises:
- determining whether the name is within a list of subjective identifiers; and
- removing the name from the caller ID information responsive to the name being within the list of subjective identifiers.

17. The storage medium of claim 16, wherein the list of subjective identifiers comprises names known to denote relationships between two people.

* * * * *